(12) United States Patent
Gurney et al.

(10) Patent No.: US 7,949,957 B2
(45) Date of Patent: May 24, 2011

(54) EDIT SELECTION CONTROL

(75) Inventors: Daniel C. Gurney, Worcester, MA (US); Vinod R. Seraphin, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 1824 days.

(21) Appl. No.: 10/335,018

(22) Filed: Dec. 31, 2002

(65) Prior Publication Data

US 2004/0128309 A1      Jul. 1, 2004

(51) Int. Cl.
*G06F 3/00* (2006.01)
(52) U.S. Cl. .................. 715/810; 715/843; 715/825
(58) Field of Classification Search .................. 715/810, 715/843, 825
See application file for complete search history.

(56) References Cited

U.S. PATENT DOCUMENTS

| 6,101,510 | A | 8/2000 | Stone et al. | 707/513 |
| 6,397,219 | B2 | 5/2002 | Mills | 707/10 |
| 2002/0019941 | A1 | 2/2002 | Chan et al. | 713/185 |
| 2002/0167548 | A1* | 11/2002 | Murray | 345/825 |
| 2004/0122789 | A1* | 6/2004 | Ostertag et al. | 707/1 |

FOREIGN PATENT DOCUMENTS

WO    PCT/GB03/05510    2/2005

OTHER PUBLICATIONS yCode, "handy DHTML controls", Dec. 2, 2001, Internet: www.ycode.com, Retrieved from: http://web.archive.org/web/*/www.ycode.com, on Mar. 16, 2006.*

Google, "Google", Dec. 17, 2001, Internet: www.google.com, Retrieved from: http://web.archive.org/web/*/http://google.com, on Mar. 16, 2006.*

Nuzzolillo, Jared, Combobox, Mar. 2001, pp. 1-8.*

Google Toolbar, Mar. 2001, pp. 1-10.*

Vickery, Paul, "CComboBox with support History", Oct. 1, 2002, pp. 1-6.*

Combo Boxes in Forms on Web Pages; Jan. 26, 2005; http://web.archive.org/web/20021226093701/http://www.cs.tut.fi/~jkorpeta/forms/combo.

YCode Home Combo Box Advanced Example; XP-002315291.

Korpela, Jukka; Combo boxes in forms on Web pages"; Internet Article [Online], Dec. 26, 2002; XP002315290 Retrieved from Internet: http://web.archive.org/web/20021226093701/http://www.cs.tut.fi/~jkorpela/forms/combo.html>[retrieved on Jan. 26, 2005]".

Anonymous; "yCode Combo Box v.1.7" Internet Article;[Online] Nov. 29, 2002, XP002315291; Retrieved from the Internet: http://web.archive.org/web/20021129073 058/http://www.ycode.com/> [retrieved on Jan. 26, 2005].

yCode Combo Box, "Screen Capture Image" (URL: http://web.archive.org/web/20021129063058/http://www.ycode.com,).

* cited by examiner

*Primary Examiner* — Ryan F Pitaro
(74) *Attorney, Agent, or Firm* — Steven M. Greenberg, Esq.; Carey, Rodriguez, Greenberg & Paul

(57) ABSTRACT

An edit selection control. The edit selection control can include a drop down list box coupled to a list of entries of full textual length; an edit box coupled to the drop down list box within the edit selection control and configured to display a selected one of the entries; and, list management logic coupled to the edit box and programmed to accept through the edit box as an alternative selection to the list of entries, a manually specified entry. Importantly, the edit selection control can have a structure configurable for embedding within a markup language document.

7 Claims, 3 Drawing Sheets

EDIT SELECTION CONTROL

BACKGROUND OF THE INVENTION

1. Statement of the Technical Field

The present invention relates to the field of user interface controls and more particularly, to a drop-down box control.

2. Description of the Related Art

The conventional graphical user interface (GUI) has been widely used for many years. The primary function of the GUI includes providing user interface controls with which the end-user can interact with an underlying application. The common GUI includes many stock user interface controls, most of which, when combined, can accommodate most computer-human interactions required by an application. For example, the static text box control can be used to present text to the end-user while an edit box can permit the user to provide textual input to the application. A radio button control can provide for the exclusive selection of an element from among a field of elements, while a checklist box can control can provide for the non-exclusive selection of elements from among a field of elements.

The conventional drop-down box is a well-known GUI control in which an end-user can select an entry from among a set of entries stored in association with the drop-down box. Advantageously, though, in the nominal state, only one entry may be visible at any one time, while the remaining entries in the set remain hidden from display. Only upon activating a region of the drop-down control will the remainder of the set of entries be displayed in a "drop-down" fashion. Hence, this type of control can conserve valuable display space when not in use. Nevertheless, the conventional drop-down box control suffers from several inherent deficiencies.

First, in a conventional drop-down box control, the set of entries are static in nature and cannot be changed dynamically by the end-user. More particularly, the conventional drop-down box lacks editable entries in the set. Rather, the end-user must select one or more of the entries already defined in the set of entries. Also, the width of the drop-down box control varies proportionally to the widest width of the text of any one entry in the set of entries. Accordingly, the advantage of conserving screen real estate can be lost upon a very wide set of entries. Finally, the conventional drop-down box is truly static in nature and cannot undertake computational operations based upon the selected entries in the set of entries. In consequence, though useful in and of itself, the conventional drop-down box can be limited in use.

Complex variations of drop-down boxes exist in most "Windows" applications, but the same cannot be said of pure hypertext markup language (HTML) based GUI applications. Yet, as many UNIX and Windows GUI applications are transformed to Web applications, it will become important to implement complex combination controls using markup language and embedded scripts only in order to provide end-users with the same convenient interactive experience which otherwise would be expected in a desktop, stand-alone execution application.

As an example, HTML provides many different types of GUI controls for inputting text. Yet, on certain occasions, it would be convenient for an end-user to select an entry from a set of entries, while maintaining the ability to add a new entry. For instance, a typical time control can offer the end-user the ability to choose a standard time such as "11:00 AM" from among a listing of pre-established times. Still, the typical time control cannot concurrently permit the end-user to directly specify a time not included in the listing of times within the control. In that regard, what is an end-user to do when the end-user intends upon selecting a time of "11:05 AM", though "11:05 AM" is not included as a specified time in the drop-down control?

SUMMARY OF THE INVENTION

The present invention is an edit selection control which addresses the foregoing deficiencies of the conventional drop-down box. Specifically, the edit selection control can permit both the selection of an entry from a listing of entries in a drop-down box, and also the manual specification of the entry in lieu of a selection from within the list of entries. Moreover, the display of a selected entry in the list of entries can be abbreviated so as to reduce the screen real estate consumed by the edit list control. By abbreviated it is meant that the display of the selected entry can be of a textual length which is less than the textual length of the entry in the list of entries. Finally, the edit list control can include computation transformative logic able to convert a selection into a hidden value. Importantly, the edit selection control can have a structure defined by a dynamic markup language for use in a markup language document. For instance, the dynamic markup language can be dynamic HTML (DHTML), which further can include scripting structure.

In a preferred aspect of the present invention, the edit selection control can include a drop down list box coupled to a list of entries of full textual length. The edit selection control further can include an edit box coupled to the drop down list box within the edit selection control and configured to display a selected one of the entries. Finally, list management logic can be coupled to the edit box and programmed to accept through the edit box as an alternative selection to the list of entries, a manually specified entry. Notably, the edit box can be configured to display the selected one of the entries in abbreviated textual length. Also, selection transformation logic can be coupled to the edit box and programmed to transform the selected one of the entries into a hidden value. Finally, keyboard navigation logic can be included for navigating the edit selection control in lieu of using an alternative means such as a pointing device.

A method of selecting an entry in an edit selection control can include receiving focus in the edit selection control. A user request to drop down a list of entries can be detected in the edit selection control. Responsive to a user selection of one of the entries, the user selection can be displayed in an editable text field. Yet, manual entry of a selection can be permitted in the editable text field in lieu of selecting one of the entries. In either case, the selection can be returned to a calling programmatic entity.

Importantly, the displaying step can include the step of displaying an abbreviated version of the user selection in the editable text field. Also, the method can include the step of adding the manual entry to the list of entries. The method further can include the step of transforming the selection into a hidden value. Finally, the returning step can include the step of returning the hidden value to the calling programmatic entity. Significantly, the edit selection control can be embedded in markup for rendering in a Web browser.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is an edit selection control. The edit selection control can provide the functionality of a drop-down box while permitting the dynamic specification of a user-supplied value in lieu of selecting an entry in the list associated with the drop-down box portion of the edit selection control. The display of an individual, selected entry can be abbreviated with respect to the full entry in the list of entries of the drop-down box. Specifically, the full entry can be displayed upon activating the drop-down box, yet the selected one of the entries in the list can be presented in abbreviated form to conserve screen real estate. Finally, the edit selection control can include a computational component which can return to the calling entity a computed value based upon the user-specified selection of the edit selection control.

The edit selection control can be defined according to HTML, and associated script and style-sheet logic. To that end, the edit selection control can be pluggable with respect to Web applications. Notably, by maintaining a pure HTML/scripting solution, the edit selection control can be rendered within any markup browser. That is to say, were the edit selection control to have been implemented using a pure programming language, operating system incompatibilities, might arise. Moreover, the processing requirements of a programming language can exceed that of a lightweight markup language script solution which would be preferred when deploying a Web application.

Notably, the edit selection control can permit keyboard navigation of the control for users who may be unable to operate a mouse. Specifically, through keyboard navigation, a scroll-bar interface can be mimicked which can allow the end-user to select choices both above and below a selected entry. Moreover, by combining auxiliary keystrokes, such as the depressing of ALT when selecting an arrow key, can cause the drop-down portion of the control to activate or deactivate, respectively. In this way, the edit selection control can meet or exceed the accessibility requirements of W3C for Web based controls.

Figure 1:
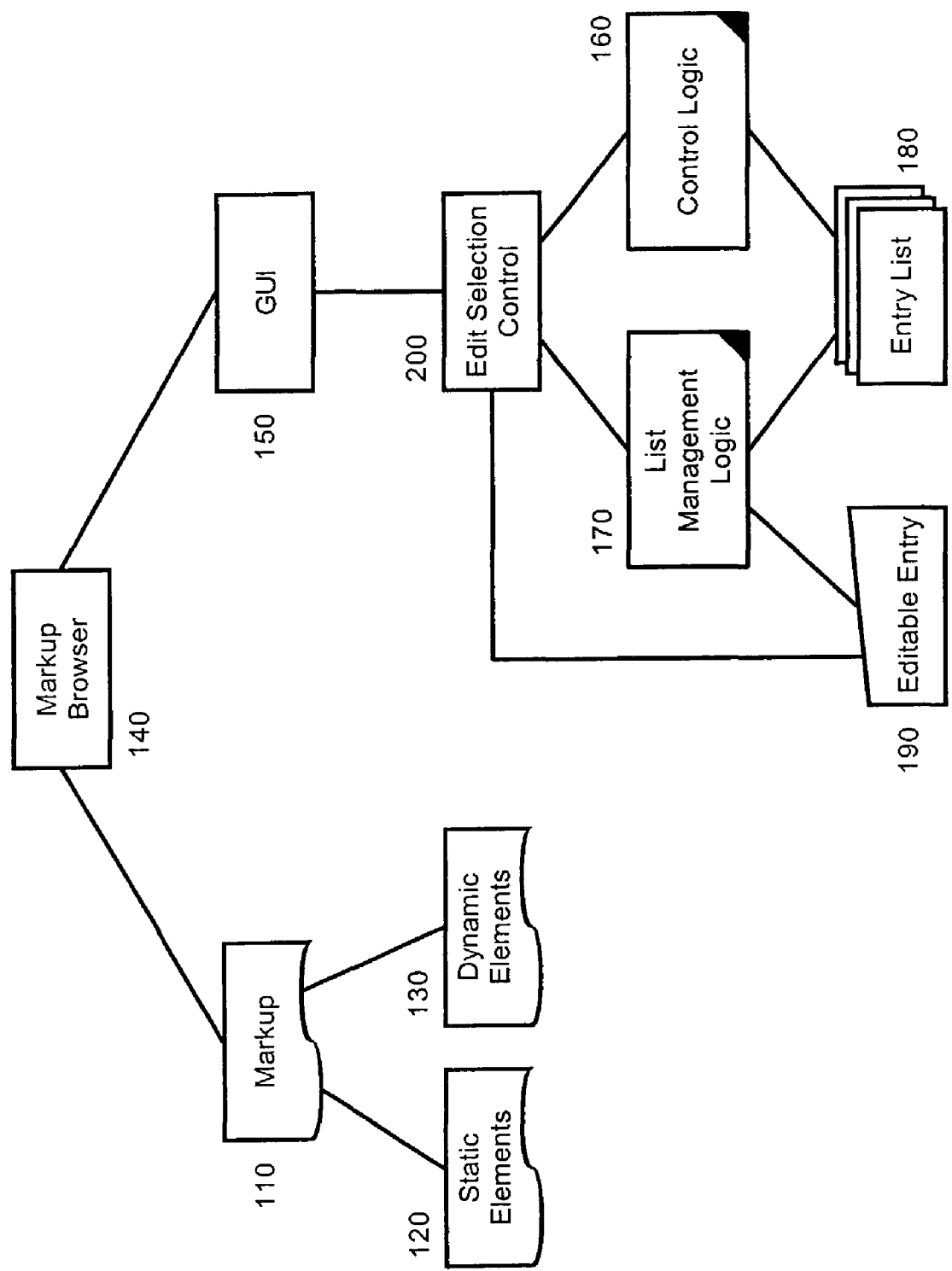
FIG. 1 is a block illustration of a markup language defined application incorporating the edit selection control of the present invention.

FIG. 1 is a block illustration of a markup language defined application incorporating the edit selection control of the present invention. The system can include a markup language document 110 defined both by static elements 120 and dynamic elements 130. The static elements 120 can include, by way of example, static text, appearance attributes, and hyperlink references. The dynamic elements 130, by comparison, can include, by way of example, embedded code or scripts able to undertake processing dynamically when the markup 110 is rendered by a markup browser 140.

Notably, the dynamic elements 130 of the markup 110 can define an edit selection control 200 which has been configured in accordance with the inventive arrangements. More particularly, when the markup 110 is rendered in the markup browser 140, a GUI 150 can be presented which can include, as a user interface component, an edit selection control 200. The edit selection control 200 can include an integrated text edit field and drop-down list box such a selected or default selection of an entry from among a list of entries in the drop-down list box can be presented in the text edit field. Yet, the end-user can edit the contents of the text edit field so as to supplement the entries in the list.

The edit selection control 200 can include both list management logic 170 and control logic 160. The list management logic 170 can manage the contents of the list of entries 180 included for display in drop-down list box format. Additionally, the list management logic 170 can permit the manual entry by the end-user of a value not specified in the list of entries 180. Also, the list management logic 170 can permit the insertion of the user-specified value into the list of entries 180. The control logic 160, by comparison, can manage the operation of the edit selection control 200, including background computational processing performed upon a user selection.

Figure 2:
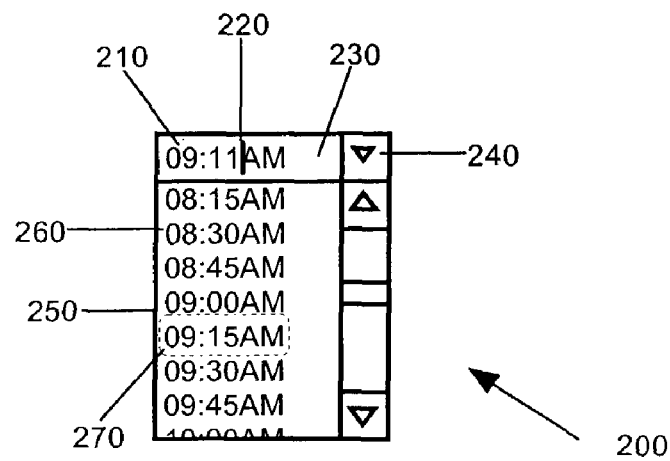
FIG. 2 is an exemplary screen shot of an edit selection control which has been configured in accordance with the inventive arrangements.

FIG. 2 is an exemplary screen shot of an edit selection control 200 which has been configured in accordance with the inventive arrangements. Specifically, by reference to FIG. 2, a time control is shown which inherits the functionality of the edit selection control of the present invention. The edit selection control 200 shown in FIG. 2 can include a drop-down list box 250 which can be activated by drop-down arrow 240. The drop-down list box 250 can include a list of entries 260 which can be individually selected using keyboard or pointing-device navigation, for instance. Where the values within the list of entries 260 are not considered suitable for the end-user, an edit box 230 can accept manually entered values 210 by activating the edit box 230, for instance through the use of an insertion marker 220. In the exemplary time control, for example, the time "9:11 AM" can be entered as the nearest entry 270, "9:15 AM", lacks the precision required by the end-user.

Importantly, the edit selection control 200 can calculate a hidden value based upon a selected entry. Moreover, the computational functionality of the edit selection control can be provided, regardless of whether the selected entry is provided manually in the edit box 230, or automatically, through the list of entries 260 in the drop-down list box 250. In the case illustrated in FIG. 2, the manually provided time, "09:11 AM" can be computed to its ISO-8601 value of T091100. In this way, the edit selection control 200 need not return a selected value to the calling application. Rather, the edit selection control can return a computed value to the calling application based upon the selected entry.

Figure 3:
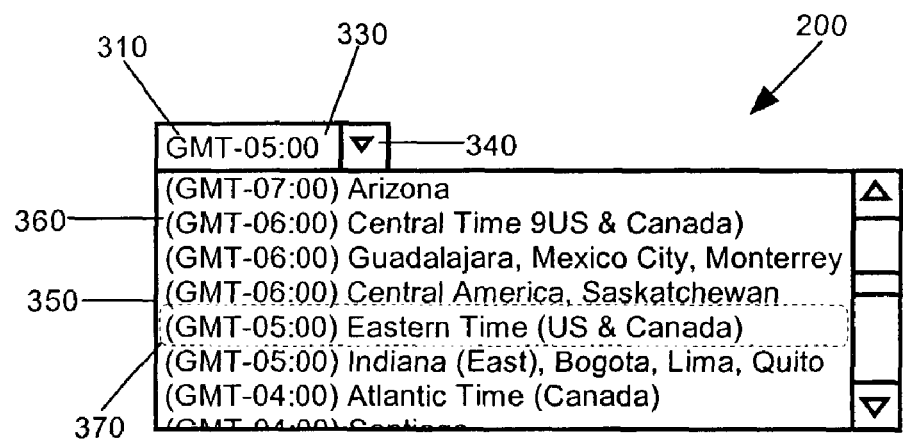
FIG. 3 is another exemplary screen shot of an edit selection control which has been configured in accordance with the inventive arrangements; and, FIG. 4 is a flow chart illustrating a process for handling user-interaction in the edit selection control of FIG. 1.

FIG. 3 is another exemplary screen shot of an edit selection control 200 which has been configured in accordance with the inventive arrangements. The edit selection control 200 can be used as a basis for a time zone control. As in the case of the time control of FIG. 2, the time zone control of FIG. 3 can include both a drop-down box 350 having a list of entries 360, and an edit box 330 in which a selected entry 310 can be displayed, or in which an entry can be manually provided. Importantly, as shown in the exemplary embodiment of FIG. 3, the edit box 330 need not display the verbatim text of a selected entry 370 in the list of entries 360 in the drop-down box 350. Rather, an abbreviated selection 310 can be displayed such that when the drop-down box 350 has been collapsed, the edit selection control need not over-consume valuable display space.

Importantly, it will also be recognized by one skilled in the art that when the drop-down box 350 has been activated so as to display the list of entries 360, the covered portions of the display space do not obscure the selections in the list of entries 360. Rather, those portions of the display space affected by the drop down box 350 can be hidden from view so as to not affect the display of the list of entries 360.

Figure 4:
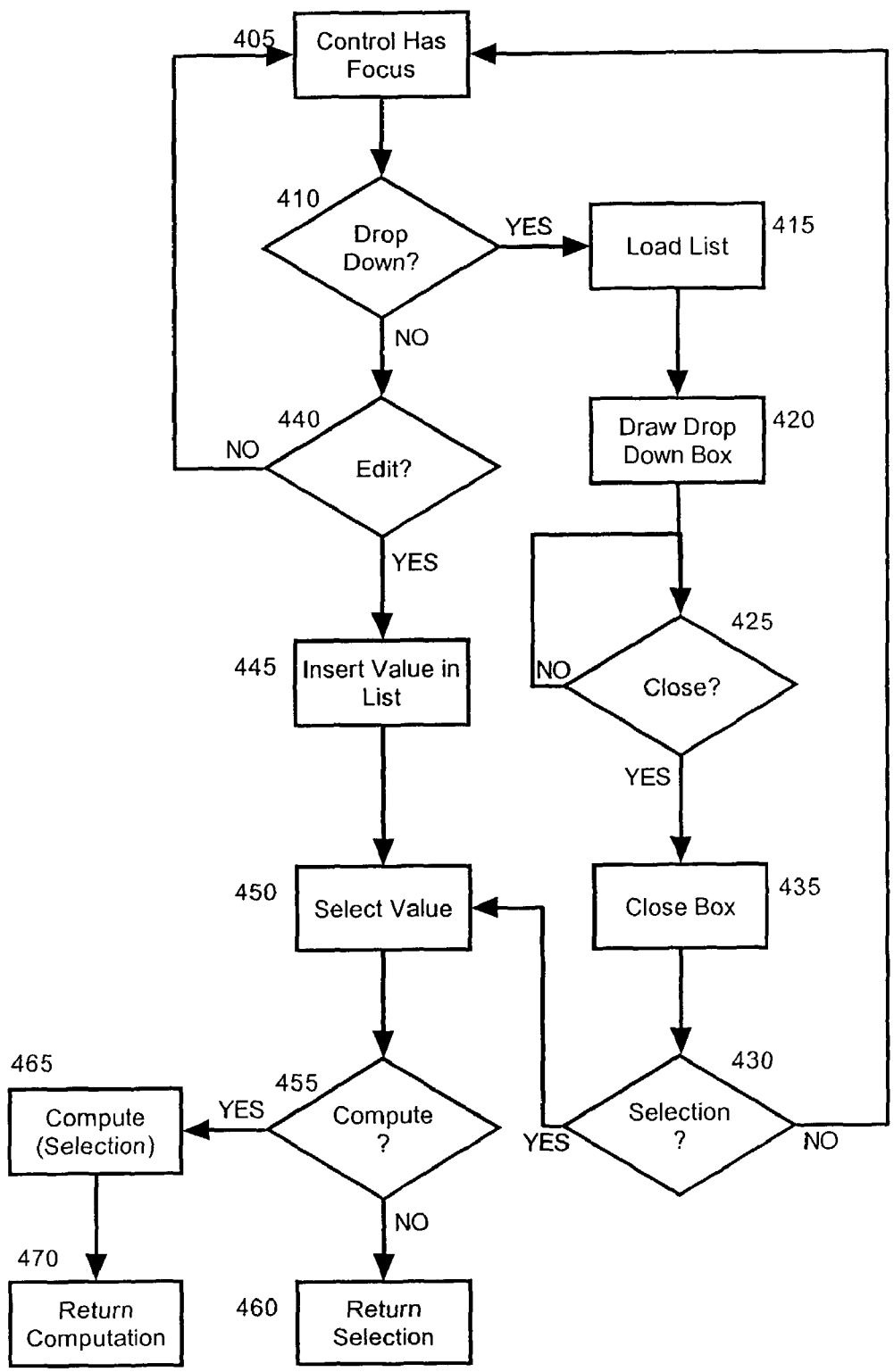

FIG. 4 is a flow chart illustrating a process for handling user-interaction in the edit selection control of FIG. 1. Beginning in block 405, the edit selection control can receive focus. In decision block 410, it can be determined whether the drop-down portion of the control has been activated. If so, in block 415, the list of entries associated with the control can be loaded and in block 420, the list can be displayed within the drop-down box. Subsequently, the end-user will be free to select an entry from among the list of entries in the drop-down box. When an entry has been selected, the selection can be displayed in the edit box portion of the control. Yet, where an abbreviated version of the selection is available, the abbreviated version can be displayed in lieu of the full text of the selection.

In any case, in block 425 it can be determined whether or not to close the box and in decision block 430 it can be determined whether a selection has been made from among the list of entries in the drop-down box. Regardless, in block 435 the drop-down box can be closed. Yet, if a selection has been made, in block 450 a value can be selected and in decision block 455 it can be determined whether a hidden value is to be computed for the selected value. If not, in block 460 the selection can be returned. Otherwise, in block 465 the computation can be performed based upon the selected value and in block 470 the computed value can be returned.

Returning now to decision block 410, if a drop-down box has not been activated, in decision block 440 it can be determined whether the edit box has been activated. If so, a manually supplied entry can be accepted in the edit box and in block 445 the manually supplied entry can be inserted into the list of entries of the drop-down box. Subsequently, in block 450 the value for the entry can be selected and in decision block 455 it can be determined whether a hidden value is to be computed for the selected value. If not, in block 460 the selection can be returned. Otherwise, in block 465 the computation can be performed based upon the selected value and in block 470 the computed value can be returned.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. An edit selection control article of manufacture comprising:
    a combo box coupled to a list of entries of full textual length;
    an edit box coupled to said combo box within the edit selection control and configured to display a selected one of said entries;
    and, list management logic executing in memory of a computer coupled to said edit box and programmed to accept through said edit box as an alternative selection to said list of entries, a manually specified entry;
    the edit selection control having a structure defined by a dynamic markup language for use in a markup language document;
    and, selection transformation logic coupled to said edit box and programmed to transform said selected one of said entries into a hidden value and to return the computed value to a calling application based upon the selected one of the entries.

2. The edit selection control of claim 1, wherein said dynamic markup language comprises dynamic hypertext markup language (DHTML).

3. The edit selection control of claim 1, wherein said edit box is configured to display said selected one of said entries in abbreviated textual length.

4. The edit selection control of claim 1, further comprising keyboard navigation logic for navigating the edit selection control.

5. A method of selecting an entry in an edit selection control, the method comprising the steps of:
    receiving focus in the edit selection control;
    detecting a user request to drop down a list of entries in the edit selection control;
    responsive to a user selection of one of said entries, displaying an abbreviated version of said user selection in an editable text field;
    permitting manual entry of a selection in said editable text field in lieu of selecting one of said entries;
    transforming said selection into a hidden value;
    returning said hidden value to a calling programmatic entity; and,
    adding said manual entry to said list of entries.

6. The method of claim 5, further comprising the step of embedding the edit selection control in markup for rendering in a Web browser.

7. A non-transitory machine readable storage having stored thereon a computer program for selecting an entry in an edit selection control, said computer program comprising a routine set of instructions for causing the machine to perform the steps of:
    receiving focus in the edit selection control;
    detecting a user request to drop down a list of entries in the edit selection control;
    responsive to a user selection of one of said entries, displaying an abbreviated version of said user selection in an editable text field;
    permitting manual entry of a selection in said editable text field in lieu of selecting one of said entries; transforming said selection into a hidden value;
    returning said hidden value to a calling programmatic entity;
    and, adding said manual entry to said list of entries.

* * * * *